Patented Feb. 14, 1933

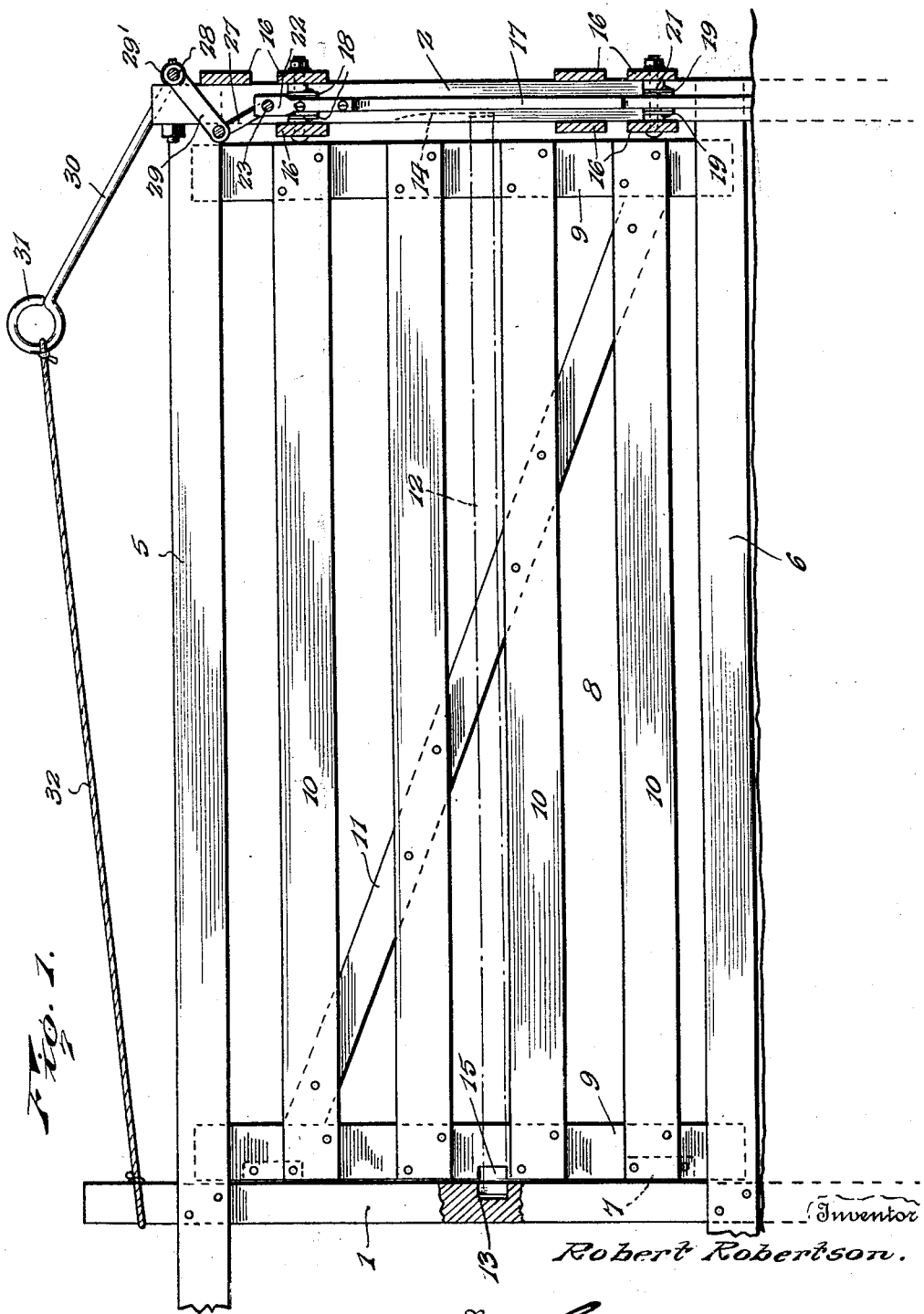

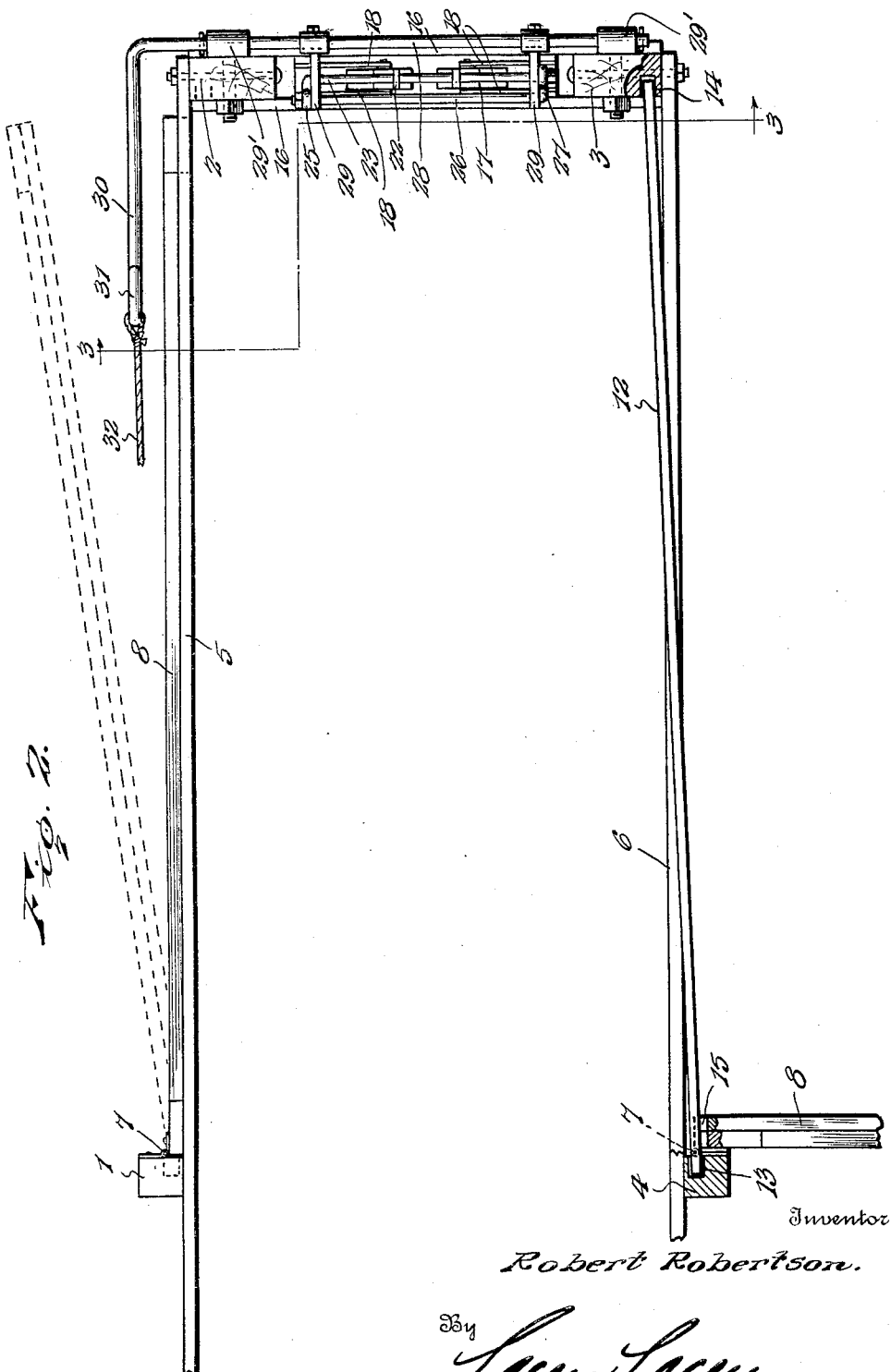

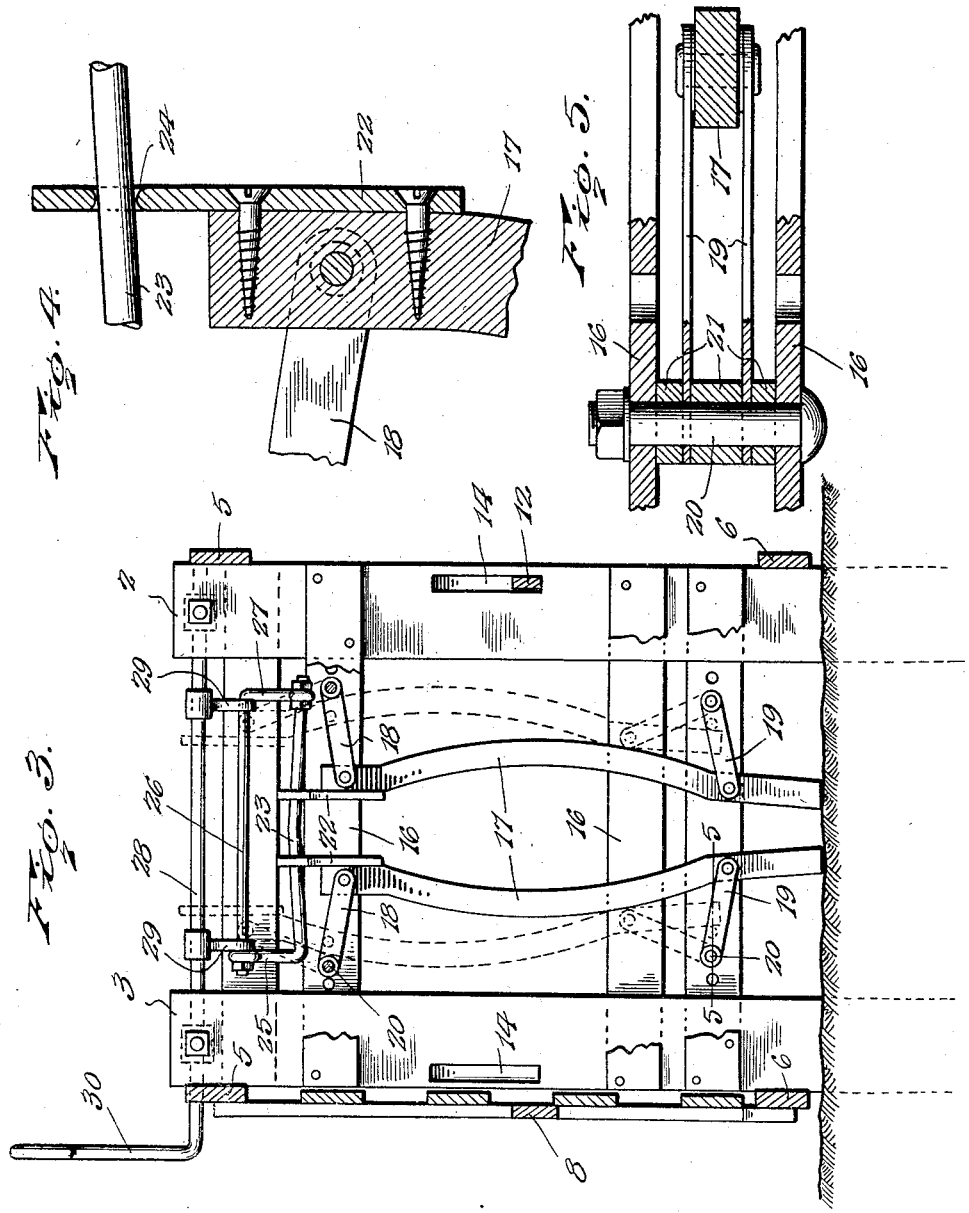

1,897,441

UNITED STATES PATENT OFFICE

ROBERT ROBERTSON, OF GOLDTHWAITE, TEXAS

ANIMAL PEN

Application filed February 20, 1930. Serial No. 430,002.

The present invention seeks to provide a pen or chute in which an animal may be confined without injury to the animal and securely held in an upright position while being treated medicinally or surgically, fed or milked. It is also an object of the invention to provide an apparatus for the stated purpose which will firmly secure the animal and resist his efforts to free himself while he may be readily released when confinement is no longer necessary, and another object of the invention is to provide such a structure which will permit an operator or attendant to have access to the animal while at the same time the animal will be restrained sufficiently to prevent injury to the operator. Other objects will appear incidentally in the course of the following description, and the invention resides in certain novel features which will be particularly pointed out in the appended claims.

In the accompanying drawings:

Figure 1 is a view, partly in side elevation and partly in vertical section, of a pen or chute embodying the invention, Fig. 2 is a top plan view of the same, Fig. 3 is a vertical transverse section on the line 3—3 of Fig. 2, Fig. 4 is an enlarged detail section through the connection between a yoke member or head-holding lever and the bar upon which it is suspended for operation, and Fig. 5 is an enlarged detail section on the line 5—5 of Fig. 3.

In carrying out the present invention, there are provided a plurality of posts 1, 2, 3 and 4 which may be set in the ground, as indicated in Fig. 1, or may be arranged to be supported upon the floor of a barn or other enclosure. The posts 1 and 4 are somewhat smaller in cross section than the posts 2 and 3 and are set at some greater distance apart, the posts 2 and 3 being erected at the head of the pen or chute and carrying the elements whereby the animal's head is secured. Upper and lower side bars 5 and 6 are secured to the inner sides of the posts 1 and 4 and the outer sides of the posts 2 and 3, as shown in Figs. 1 and 2, and these side bars may be of any desired length, the ends thereof remote from the posts 2 and 3 being free of each other so that the pen or chute at said end is constantly open to facilitate the entrance of the animal. Mounted upon each post 1 and 4 by hinges 7 are gates 8 which are adapted to close the sides of the pen or chute and in the closed position to bear against the side bars 5 and 6 immediately adjacent the post 2 or 3, as the case may be, as shown in Fig. 1. These gates may be of any approved form and are illustrated as consisting of stiles 9, rails 10 secured to and extending between the stiles, and a diagonal brace 11, all of which will be understood upon reference to the drawings. Normally, the gates will lie close to the respective sides of the chute, as shown in the upper portion of Fig. 2, but they may swing away therefrom, as indicated by the dotted lines in Fig. 2 and at the lower portion of said figure. When either gate is opened, a locking bar 12 is employed to prevent the animal moving through the opened side of the pen and this bar has its rear end engaged in a socket 13 provided therefor in the rear post 1 or 4 and its front end engaged in a recess 14 in the front post so that it will be firmly supported and prove an effectual barrier to sidewise movement or attempted movement of the animal. At the same time the open side of the pen will permit free access of the operator to the animal so that the desired treatment may be easily accomplished. When the gate is closed, the locking bar is, of course, withdrawn, but in order to prevent possible damage to either the gate or the locking bar by attempted closing of the gate while the bar is in place, a notch 15 is formed in the rear stile 9, as shown in Fig. 1, to accommodate the bar.

The front posts 2 and 3 are connected and braced adjacent their upper and lower ends by cross bars 16, and a yoke consisting of bowed bars 17 is supported by these cross bars between the posts for the purpose of engaging around the neck of the animal and thereby firmly holding the animal's head. The yokes or bars 17 are pivotally attached at their upper ends to links 18 and adjacent their lower ends to similar links 19, the links being pivoted at their outer ends upon bolts 20 which are fitted through the respective cross bars 16, spacing collars 21 being fitted around the bolts between the links and between the links and the cross bars, as clearly shown in Fig. 5. The fulcrum bolts 20 are shiftable so that the yoke bars 17 may be set at various distances apart according to the thickness of the necks of different animals. Upon reference to Fig. 3, it will be noted that when the yoke is closed the links 18 and 19 will extend slightly downwardly so that they will lock the yoke in the closed position against the efforts of the animal to free its head. Secured to the inner edge of each yoke member 17 and extending upwardly therefrom at the upper end thereof is a hanger 22 which engages at its upper end around a lifter rod 23, the opening 24 in the upper end of the hanger through which the lifter rod passes being beveled toward both faces of the hanger so that there will be slight contact between the hanger and the rod and the hanger may move freely upon the rod with minimum frictional resistance and wear. The lifter rod 23, as shown clearly in Fig. 3, is preferably bent so that it inclines downwardly from its center toward both ends, this form of the rod facilitating the opening movement of the yoke in the operation of the device. The lifting rod is provided at one end with a standing crank 25 which at its end engages loosely around one end of a rod 26, said rod 26 having its opposite end formed into a depending crank 27 which, in turn, is engaged around the adjacent end of the lifting rod 23. This particular arrangement facilitates the assembling of the parts, but it is to be understood that a single crank at the center of the lifting rod may be provided and this single crank connected with a single operating crank or lever carried by the rock shaft 28. In order to provide for a more even movement of the lifting rod, however, I prefer to employ cranks at both ends thereof, as shown, and engage the connecting rod 26 through cranks 29 spaced apart on the rock shaft 28. The rock shaft 28 is mounted in suitable bearings 29' on the front of the posts 2 and 3 at the upper ends of the posts and at one end it is provided with an operating crank or lever 30, as shown. The operating crank or lever 30 is formed with an eye or ring 31 at its free end whereby weight is added to the lever so that it will aid in holding the yoke in the closed position to resist efforts of the animal to free its head. A cable or other flexible element 32 is engaged with the eye 31 and extended rearwardly therefrom so that it may be operated by a person standing at the back of the animal to be confined, the cable being secured to the post 1, as clearly shown in Fig. 1.

If the operating crank or lever 30 be rocked rearwardly and downwardly, the cranks 29 on the shaft 28 will be rocked downwardly and forwardly, as will be understood upon reference to Fig. 1, and this downward and forward movement of the cranks will be transmitted through the cranks 25 and 27 to lower the lifting bar 23 and thereby cause the yoke members 17 to descend. As they descend, they will, of course, be caused to swing toward each other through the action of the links 18 and 19 so that they will fit around the animal's neck and secure the animal's head. Reverse movement of the parts will, of course, free the animal.

While I have illustrated only a single pen or chute and have referred to the device in the foregoing description as only a single pen, it will be understood that the invention may be applied in a series or gang of pens arranged side by side and having the rock shafts 28 connected with a common operating element so that the device may be utilized as stalls in a dairy house, for instance, and a number of animals may be fastened or released simultaneously. The apparatus is very simple and may be very easily erected at low cost, and in use operates efficiently for the purposes for which it is designed.

Having thus described the invention, I claim:

1. A pen comprising a plurality of posts, side bars secured to the upper and lower ends of the posts to define the sides of the pen, means between the forward posts to secure the head of an animal, gates hinged to the rear posts and extending when closed to the forward posts, the corresponding forward and rear posts being provided with sockets in their confronting sides, and a locking bar engageable at its ends in said sockets whereby to extend from a rear post to the corresponding forward post and prevent side movement of an animal when a gate is open.

2. In a pen, head-holding means comprising a pair of posts, upper and lower cross bars connected to the posts, a rock shaft mounted on the upper ends of the posts, yoke members suspended on the cross bars for free movement in a vertical plane, and operative connections between the rock shaft and the yoke members whereby said members may be raised and separated or lowered and swung toward each other.

3. In a pen, head-holding means comprising a pair of posts, upper and lower cross bars connected to the posts, a rock shaft journaled upon the upper ends of the posts parallel with the cross bars, yoke members mounted upon the cross bars for free movement in vertical planes downward and toward or upward and from each other, a lifting rod, operative connections between the rock shaft and the lifting rod, and hangers secured to the upper ends of the yoke members and engaged around the lifting rod.

4. In a pen, head-holding means comprising a pair of posts, upper and lower cross bars connecting the posts, yoke members suspended on the cross bars for movement in vertical planes downwardly and toward or upwardly and from each other, a rock shaft journaled upon the upper ends of the posts, a crank on said rock shaft, a lifting rod, a crank rising from the lifting rod and operatively engaged with the crank on the rock shaft, and hangers rising from the upper ends of the yoke members and engaged loosely around the lifting rod.

5. In a pen, head-holding means comprising a frame, links pivoted at their outer ends on the frame, yoke bars pivoted to and carried by the inner ends of the links, and means mounted on the frame and operatively connected to the yoke bars for raising and lowering the same.

6. A pen comprising a plurality of posts, side bars secured to the upper and lower ends of the posts to define the sides of the pen, the posts at one side of the pen having sockets in their confronting sides, means between the posts at corresponding ends of the sides to secure the head of an animal and connect the posts to support the sides, a gate hinged to one post and extending when closed to the other post at the same side of the pen and provided at its hinge end with a notch alined with the socket in the adjacent post, and a locking bar engageable at its ends in the sockets in the posts and with the notch in the gate whereby to hold the gate open and prevent side movement of an animal in the pen.

In testimony whereof I affix my signature.

ROBERT ROBERTSON. [L. S.]